United States Patent [19]

Mefford

[11] Patent Number: 4,477,956
[45] Date of Patent: Oct. 23, 1984

[54] PISTON-REMOVING APPARATUS

[76] Inventor: Ray W. Mefford, P.O. Box 1162, Powell, Wyo. 82435

[21] Appl. No.: 458,730

[22] Filed: Jan. 17, 1983

Related U.S. Application Data

[63] Continuation-in-part of Ser. No. 359,262, Mar. 18, 1982, abandoned.

[51] Int. Cl.³ .............................................. B23P 19/04
[52] U.S. Cl. .................................................... 29/252
[58] Field of Search ........................ 29/251, 252, 227; 254/10.5

[56] References Cited

U.S. PATENT DOCUMENTS

| | | | |
|---|---|---|---|
| 2,142,127 | 1/1939 | Gross | 29/252 |
| 3,711,925 | 1/1973 | Mazer | 29/252 |
| 3,814,382 | 6/1974 | Castoe | 29/227 |
| 4,293,991 | 10/1981 | Bailey | 29/252 |

FOREIGN PATENT DOCUMENTS 578425  6/1946  United Kingdom .................. 29/251

Primary Examiner—Robert C. Watson
Attorney, Agent, or Firm—Arthur L. Urban

[57] ABSTRACT

Piston-removing apparatus including a frame portion, a piston-supporting portion, and an actuating portion; the frame portion including an elongated base section, an end member extending from the base section substantially perpendicular thereto; the piston-supporting portion including an upstanding member disposed along the length of the base section intermediate the ends thereof, the upstanding member extending substantially perpendicular to the base section and being disposed substantially parallel to the end member, the upstanding section including a central opening therethrough, a channel connecting the central opening with the periphery of the upstanding member at a point remote from the base section, a piston-aligning member removably engageable with the central opening in the upstanding member, the piston-aligning member including a sleeve section and a flange section, the sleeve section having an outside diameter slightly smaller than the central opening for insertion therein, the flange section being disposed adjacent one end of the sleeve section, the flange section being of a size larger than the central opening and bearing against the side of the upstanding member closer to the end member, a bore through the piston-aligning member having a diameter slightly larger than the diameter of a piston rod, a supporting section extending from the base section adjacent the end thereof remote from the end member aligned with the central opening in the upstanding member; the actuating portion including expandable mechanism positioned between the end member and the upstanding member in contact with the end member and spaced from the upstanding member.

5 Claims, 4 Drawing Figures

PISTON-REMOVING APPARATUS

This application is a continuation-in-part of pending application Ser. No. 359,262, filed Mar. 18, 1982, now abandoned.

This invention relates to a novel piston-removing apparatus and more particularly relates to a new apparatus for removing a piston from a piston rod.

Throughout history, man has had to move liquids from one place to another. Originally, people relied on gravity to achieve this result. Later, with the development of power sources, these expedients were utilized to transfer liquids.

As an outgrowth of the development of power sources, a wide variety of different pumps have been developed. Some pumps employ a rotating wheel to advance the liquid. Other pumps include a piston reciprocating in a cylindrical chamber. Valves also may be included to allow the liquid to fill the chamber so the piston can force the liquid from the outlet of the chamber.

The piston commonly is mounted on the end of a rod which is reciprocated through a suitable drive arrangement. The piston may have a ring positioned around its circumference as a seal between the piston and the cylinder wall. In other cases, the piston and cylinder may be carefully matched so there is a close fit between the two elements.

Periodically, it may be necessary to replace the piston. This may be required because of normal wear that may result in a poor seal with the cylinder chamber. In other situations, a piston may be damaged in use necessitating replacement.

Changing of the piston can be a time-consuming, unpleasant task. First of all, the apparatus must be opened to allow removal of the piston and rod combination from the cylinder. This step ordinarily can be performed in a short period of time.

After the piston and rod combination has been removed, there remains the task of removing the piston from the end of the rod. Frequently, this can be a very difficult job. Many piston rods have a tapered end portion so that the piston becomes more tightly secured to the rod during use. Also, after a piston has been in service for a considerable period of time, it often has become corroded and adheres tightly to the rod. As a result of these factors, removal of a piston from the end of a rod can present a major problem.

In an attempt to remove a piston from a piston rod, some individuals simply try to hammer the piston off the rod. Other people may attempt to remove this piston by trying to punch the rod from the piston.

While these expedients may be successful in a few cases, in many other situations they may not. If a person cannot separate the piston from the rod, he is faced with a number of choices. Both the piston and the rod may be discarded and new components used. Another alternative is to take the piston and rod to a machine shop and have them do the job with their special equipment.

Although one of these choices may solve the problem, they frequently do not achieve the result in a desired manner. Replacing both the piston and the rod may involve considerable additional expense, particularly with large size pumps. Also, obtaining a replacement rod may require a special order. Thus, in order to avoid an excessively long down time, it may be necessary to keep a replacement rod on hand.

Taking the piston and rod combination to a machine shop also may result in considerable down time. In addition, there is the time and expense of the person taking the trip to the machine shop and the waiting for the work to be done. Unless the machine shop has been given advance notice, there may be an additional delay waiting for the shop to fit the work into its schedule.

From the above discussion, it is clear that present methods of removing pistons from piston rods are unsatisfactory in many cases. Thus, there is a need for a new and simpler way of achieving the removal of pistons.

The present invention provides a novel apparatus for removing a piston from a piston rod easily and quickly. The piston-removing apparatus of the invention can be employed to remove pistons from rods even when the pistons are frozen to the rod. The apparatus can be used as a permanent installation or as a portable unit.

The piston-removing apparatus of the invention is simple to use after only a minimum of instruction. The apparatus can be used conveniently even by persons with minimum strength. The apparatus can be modified for different size pistons and rods easily.

The piston-removing apparatus of the invention is simple in design and relatively inexpensive. The apparatus can be manufactured from commercially available materials and components. The fabrication can be accomplished using conventional metal working techniques and procedures. The apparatus is durable in construction and requires little if any maintenance.

These and other benefits and advantages of the novel piston-removing apparatus of the present invention will be apparent from the following description and the accompanying drawings in which.

Figure 1:
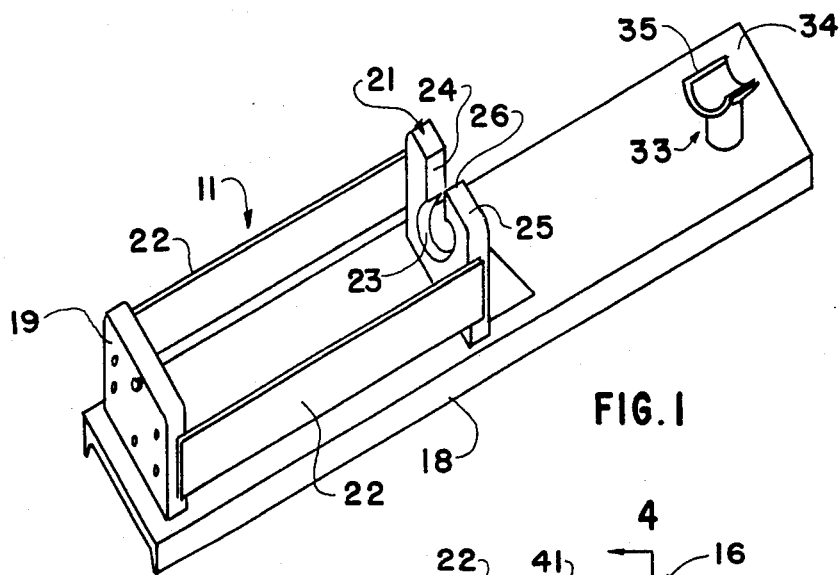
FIG. 1 is a view in perspective of one form of the piston-removing apparatus of the invention.
Figure 2:
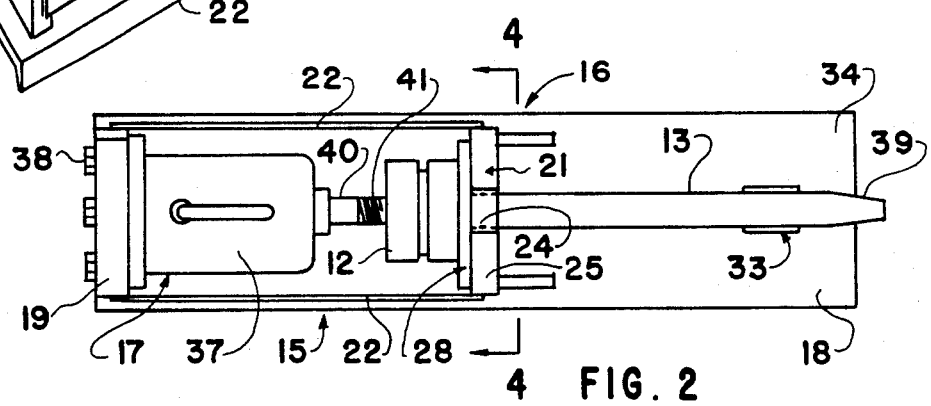
FIG. 2 is a top view of the piston-removing apparatus shown in FIG. 1 with a piston and rod in position for removal.
Figure 3:
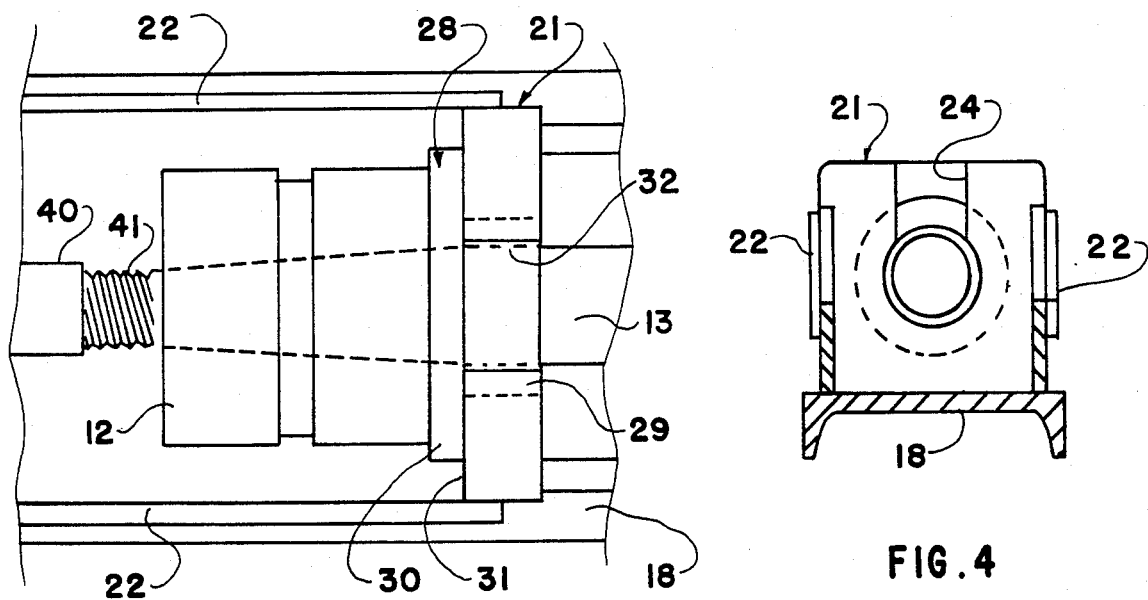
FIG. 3 is an enlarged fragmentary top view of the piston-removing apparatus shown in FIG. 2.
Figure 4:
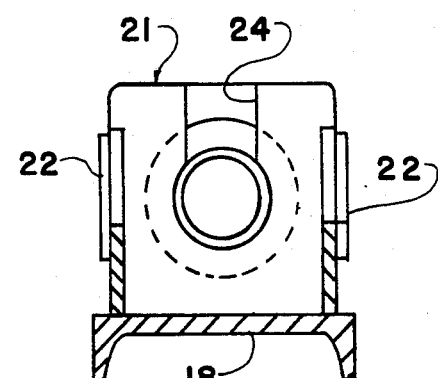
FIG. 4 is an enlarged sectional view of the piston-removing apparatus shown in FIGS. 1 and 2 taken along line 4—4 of FIG. 2.

As shown in the drawings, one form of the novel piston-removing apparatus 11 of the invention is employed for the removal of a piston 12 from a piston rod 13. The piston-removing apparatus 11 includes a frame portion 15, a piston-supporting portion 16 and an actuating portion 17.

The frame portion 15 of the piston-removing apparatus 11 of the invention includes an elongated base section 18. The elongated base section has a generally rectangular configuration. An end plate member 19 extends from the base section 18. The end member 19 extends from the base section substantially perpendicular thereto. The end member 19 is located adjacent one end of the base section.

The piston-supporting portion 16 of the apparatus 11 includes an upstanding plate member 21. The upstanding member 21 is disposed along the length of the base section 18 intermediate the ends of the base section. The upstanding member 21 extends from the base section in the same direction as the end member 19. The upstanding member is disposed substantially perpendicular to the base section 18 and substantially parallel to the end member 19.

Connector plate sections 22 extend between and join the end member 19 and the upstanding member 21. The connector sections 22 which provide structural rigidity between the end member and the upstanding member are spaced from the base section 18 as shown. The members and sections preferably are welded.

The upstanding section 21 of the piston-supporting portion 16 includes a circular central opening 23 therethrough. A channel 24 of lesser size than the central opening connects the central opening 23 with the periphery 25 of the upstanding member 21. Channel 24 intersects the periphery of the upstanding member 21 at a point 26 remote from the base section 18.

The piston-supporting portion 16 also includes a cylindrical piston-aligning member 28. The piston-aligning member 28 includes a sleeve section 29 and a flange section 30. The sleeve section 29 has an outside diameter slightly smaller than the central opening 23. This enables the sleeve section 29 to be inserted into the central opening 23.

The flange section 30 of the piston-aligning member 28 is disposed adjacent one end of the sleeve section 29. The flange section 30 is larger than the central opening 23. The flange section 30 bears against the side 31 of the upstanding member 21 closer to the end member 19.

The piston-aligning member 28 also includes a bore 32 therethrough. The bore 32 has a diameter slightly larger than the diameter of the piston rod 13. Advantageously, the piston-removing apparatus 11 includes a plurality of piston-aligning members 28 that are interchangeable. Each of the piston-aligning members has a bore 32 therethrough with a diameter different from that of every other of the members 28.

A rod support section 33 is included in the piston-supporting portion 16. The support section 33 extends from the base section 18. The rod support 33 extends from the base section adjacent the end 34 thereof which is remote from the end member 19. The upper part of the rod support section 33 includes a cradle section 35 aligned with the central opening 23 through the upstanding member 21.

The actuating portion 17 of the apparatus 11 includes expandable jack means 37. The jack means 37 is positioned between the end member 19 and the upstanding member 21. The jack means has a base affixed to the end member 19 and spaced from the upstanding member 21. Preferably, the jack means 37 is a hydraulic jack as shown. The jack means advantageously is affixed to the end member 19 with suitable fasteners shown as bolts 38.

In the use of the piston-removing apparatus 11 of the present invention as shown in the drawings, the apparatus 11 preferably is positioned on a work surface such as a table or truck bed (not shown). Then, if the piston 12 is secured to the rod with a fastener such as a nut (not shown), the fastener first is removed.

Next, the piston rod 13 is inserted through bore 32 of piston-aligning member 28. The rod 13 is inserted through the flange side of the member 28. The piston and rod combination with the member 28 thereon now is ready to be positioned in the apparatus 11.

The sleeve section 29 of the piston-aligning member 28 is inserted through central opening 23 of the upstanding member 21 and the piston 12 and the flange section 30 are pushed against side 31 of the upstanding member. The free end 39 of the rod 13 is laid on cradle section 35 of support section 33. The apparatus 11 now is ready for removal of the piston 12 from rod 13.

Jack 37 is actuated causing the moving end 40 thereof to move into contact with and bear against the end 41 of rod 13 extending from the piston 12. Further actuation of the jack 37 applies continuing force against the end 41 of the rod. Since piston 12 bears against flange section 30 of piston-aligning member 28 which is restrained by upstanding member 21, the rod 13 will be moved with respect to the piston 12. This movement is continued through the application of force by jack 37 until the rod 13 is completely separated from the piston 12.

If a piston 12 is to be removed from a piston rod 13 having a different diameter from that of the piston rod above, the apparatus 11 preferably includes a plurality of interchangeable piston-aligning members 28. Each of the piston-aligning members 28 has a bore 32 therethrough with a diameter different from that of every other piston-aligning member. In this way, the piston-aligning members have bores that can accommodate the various piston rods with different diameters. Thus, the play between the piston road and the bore is minimized to avoid lateral shifting of the rod as force is applied to the end thereof.

The above description and the accompanying drawings show that the present invention provides a novel apparatus for removing a piston from a piston rod. The apparatus of the invention allows pistons to be removed from rods easily and quickly even when the pistons are frozen on the rods. The apparatus requires only a minimum of effort and strength to remove the piston.

The piston-removing apparatus of the present invention can be used conveniently after only limited instruction. The apparatus can be converted for use with piston rods of different sizes easily.

The apparatus of the invention is simple in design and can be produced relatively inexpensively. Commercially available materials and components can be employed in its fabrication. Conventional industrial metal working techniques and procedures may be utilized in the manufacture of the apparatus. The apparatus of the invention is durable in construction and has a long useful life with little if any maintenance.

It will be apparent that various modifications can be made in the particular piston-removing apparatus described in detail above and shown in the drawings within the scope of the invention. The size, configuration and arrangement of components can be different to meet specific requirements. Also, the apparatus can be modified to facilitate operation in a vertical orientation. In addition, the spacing and disposition of the end member and upstanding member can be changed to accommodate particular jack mechanisms. These and other changes can be made in the piston-removing apparatus of the invention provided the functioning and operation of the apparatus are not deleteriously affected. Therefore, the scope of the invention is to be limited only by the following claims.

What is claimed is:

1. Piston-removing apparatus including a frame portion, a piston-supporting portion, and an actuating portion; said frame portion including an elongated base section, said elongated base section having a generally rectangular configuration, an end plate member extending from adjacent one end of said base section and substantially perpendicular thereto; said piston-supporting portion including an upstanding plate member disposed along the length of said base section intermediate the ends thereof, said upstanding plate member extending from said base section in the same direction as said end member, said upstanding member being substantially perpendicular to said base section and substantially parallel to said end member, connector plate sections extending between and joining said end member and said upstanding member, said connector sections being spaced from said base section, said upstanding member including a circular central opening therethrough, a channel of lesser size than said central opening connecting said central opening with the periphery of said upstanding member at a point remote from said base section, a cylindrical piston-aligning member removably engageable with said central opening in said upstanding member, said piston-aligning member including a sleeve section and a flange section, said flange section being disposed adjacent one end of said sleeve section, said sleeve section having an outside diameter slightly smaller than said central opening for insertion therein, said flange section being of a size larger than said central opening, said flange section bearing against the side of said upstanding member closer to said end member, a bore through said piston-aligning member, said bore having a diameter slightly larger than the diameter of a piston rod, a rod support section extending from said base section adjacent the end thereof remote from said end member, said support section including a cradle section at the free end thereof aligned with said central opening in said upstanding member; said actuating portion including expandable jack means with a base, said jack means being positioned between said end member and said upstanding member, said jack means having its base affixed to said end member and being spaced from said upstanding member; whereby inserting a piston rod through said central opening in said piston-aligning member with a piston thereon disposed toward said jack means and actuating of said jack means forces said piston rod from said piston.

2. Piston-removing apparatus according to claim 1 including a plurality of interchangeable piston-aligning members, each of said piston-aligning members having a bore therethrough of a diameter different from that of every other of said piston-aligning members.

3. Piston-removing apparatus according to claim 1 wherein said end member, said upstanding member and said support section are welded to said base section and said connector sections are welded to said end member and said upstanding member.

4. Piston-removing apparatus according to claim 1 wherein said base section is a unitary structure.

5. Piston-removing apparatus according to claim 1 wherein said jack means includes a hydraulic jack.

* * * * *